May 9, 1944.  M. A. WECKERLY  2,348,372
WEIGHING SCALE
Filed Jan. 21, 1942      4 Sheets-Sheet 1
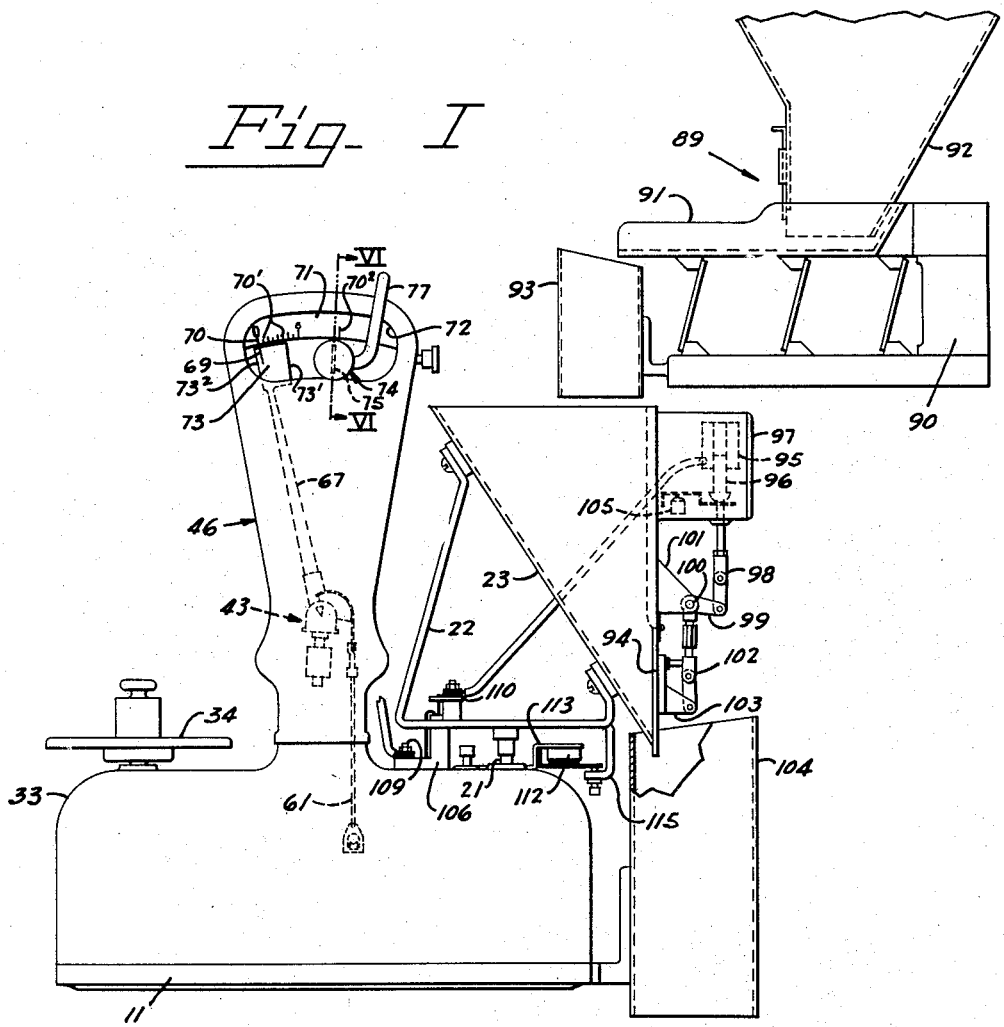
Mark A. Weckerly
INVENTOR
BY Marshall & Marshall
ATTORNEYS

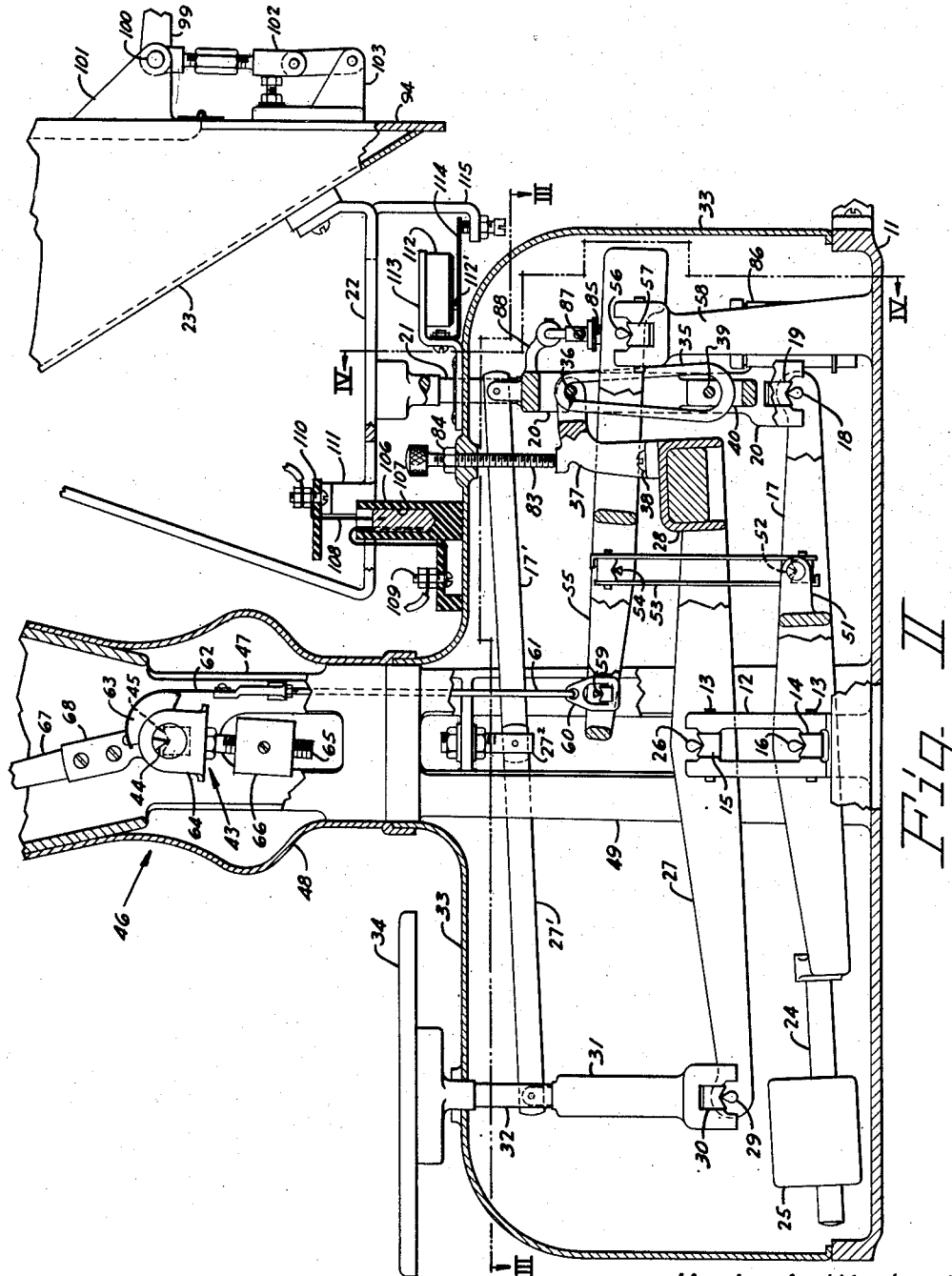
Fig. II

May 9, 1944.  M. A. WECKERLY  2,348,372
WEIGHING SCALE
Filed Jan. 21, 1942  4 Sheets-Sheet 3
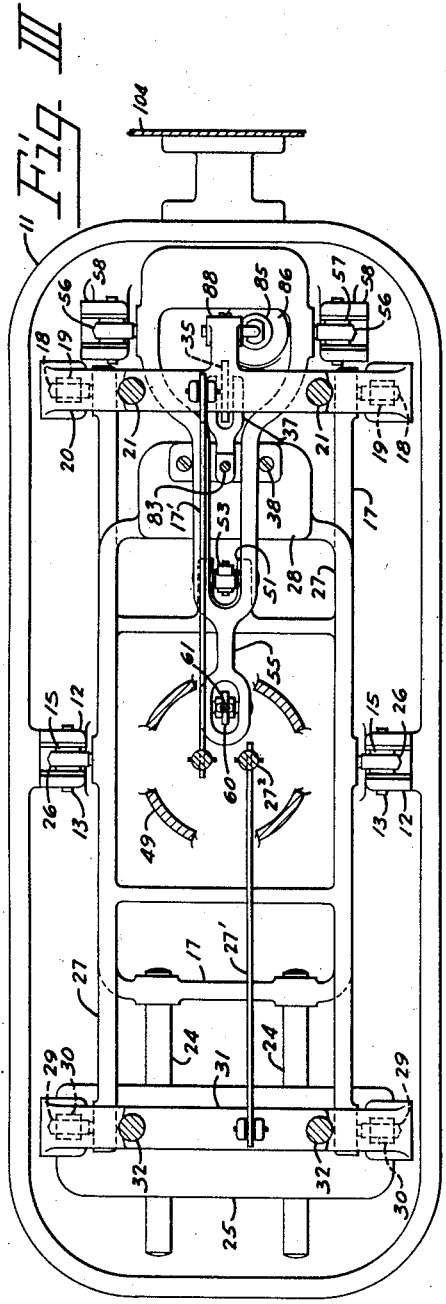
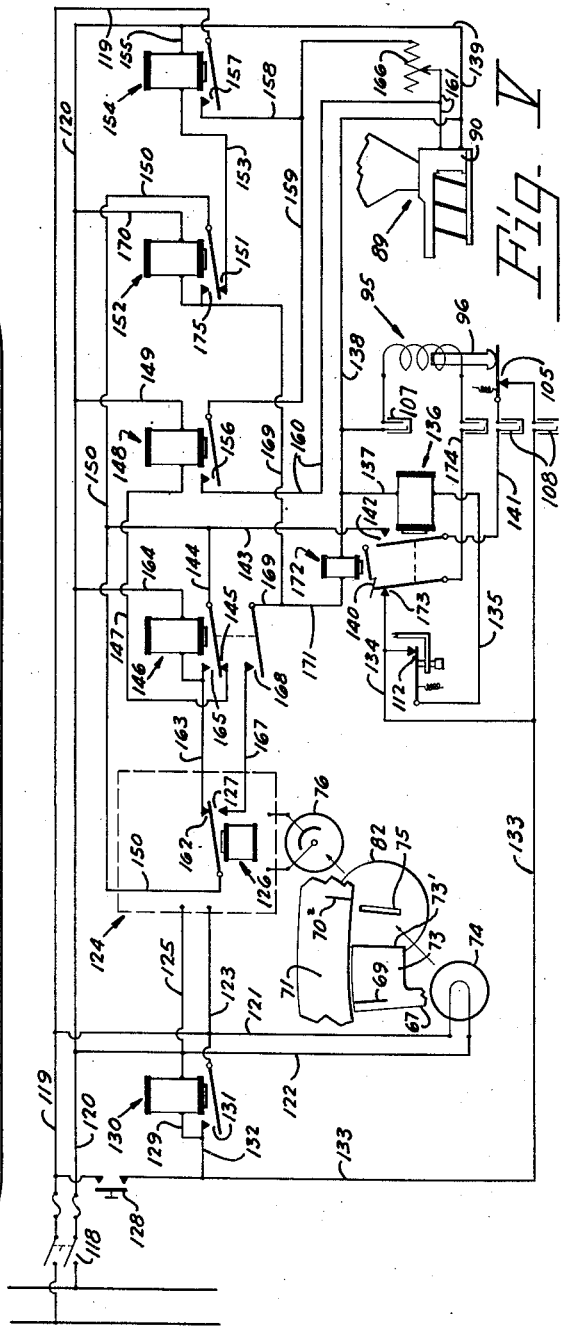
Mark A. Weckerly
INVENTOR
BY Marshall & Marshall
ATTORNEYS

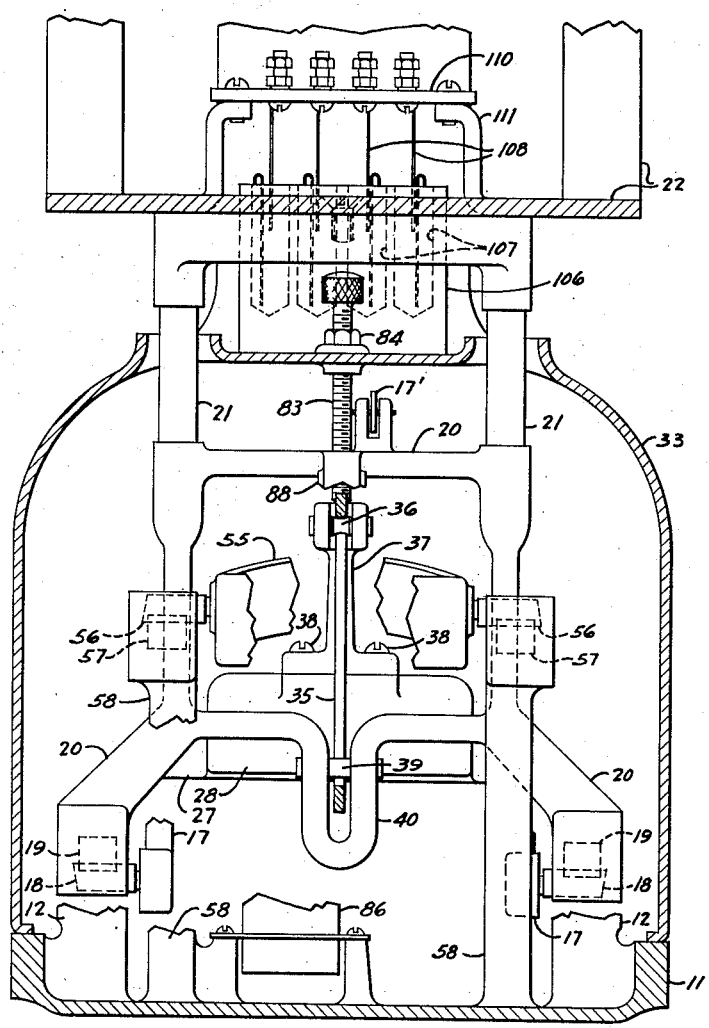
Fig. IV

Patented May 9, 1944

2,348,372

UNITED STATES PATENT OFFICE 2,348,372

WEIGHING SCALE

Mark A. Weckerly, Toledo, Ohio, assignor to Toledo Scale Company, Toledo, Ohio, a corporation of New Jersey Application January 21, 1942, Serial No. 427,627

7 Claims. (Cl. 249—45)

This invention relates generally to weighing scales, and more particularly to weighing scales which are adapted to automatically determine and deliver loads of predetermined weight. Scales of this kind usually cooperate with and control the operation of means for feeding the material into a hopper which forms a part of the load supporting means of the scale. They are also usually provided with means whereby the weighing mechanism can be "back-weighted" the amount of the desired load and have means for initiating the operation of the feeding means, as well as for stopping the feed when the desired amount has been deposited into the hopper and for discharging the material.

Certain materials however do not readily discharge from the hopper, some have a tendency to "bridge" between the hopper walls and, therefore, a portion remains in the hopper, and of other materials that are sticky some of the material sticks to the walls of the hopper when the load is being discharged.

When scales are "back-weighted" the amount of the predetermined weight by means of a poise and beam or by a standard weight placed on a counterpoise platter, the weighing mechanism is "overbalanced" until the weight of the load in the load receiver nearly equals that of the "back-weight." When the condition of the scale approaches equilibrium, the indicator becomes active to indicate the condition of balance. When a relatively small portion of the load has been discharged from the load receiver, the "back-weight" again overbalances the weighing mechanism, the indicator again becomes inactive and if a small portion of the load remains in the hopper the operator of the device is not aware of it.

The present invention therefore has for its principal object the provision of improved means for automatically and accurately determining loads of predetermined weight.

Another object is the provision of improved means whereby the indicator of a "back-weighted" scale is in a state of activity for a portion of the weighing operation to indicate the presence of material in the weighing hopper.

Another object is the provision of improved means for controlling material feeding means and preventing their operation until all of the material of the previous weighing operation has been discharged from the scale hopper.

Another object is the provision of an improved scale lever system.

A still further object is the provision of an improved electrical interlocking control circuit.

These, and other objects and advantages will be apparent from the following description in which reference is had to the accompanying drawings, illustrating a preferred embodiment of the invention and in which similar reference numerals refer to similar parts throughout the several views.

In the drawings:

Fig. I is a front elevational view of a weighing scale embodying the invention and showing the material feeding and material receiving means.

Fig. II is an enlarged sectional front elevational view of the base and of a fragment of the indicator housing of the scale.

Fig. III is a sectional plan view of the base of the scale, the section being along the line III—III of Fig. II, the base cover being removed.

Fig. IV is a sectional end elevation of the base, sectioned substantially along the line IV—IV of Fig. II.

Fig. V is a diagram of an electrical circuit embodying a portion of the invention; and Fig. VI is an enlarged fragmentary sectional view, sectioned substantially along the line VI—VI of Fig. I, and showing in detail the relation of the light source, the indicator and the photoelectric tube.

Referring to the drawings in detail:

Extending upwardly from a base 11, which preferably is a rigid iron casting, are a pair of bifurcated fulcrum stands 12. Pintles 13, extending between the arms formed by the furcation, support, in vertical alignment, V grooved bearing blocks 14 and 15. Resting in the V grooves of the bearing blocks 14 are fulcrum pivots 16 of a load supporting lever 17. In spaced relation to these fulcrum pivots, and positioned adjacent one end of this lever, is a pair of load pivots 18 and mounted upon these pivots, by means of suitable V bearing blocks 19, is a load support spider 20. Surmounting posts 21, which are studded in the upper end of this spider, is a load supporting frame 22 to which, in the illustrated embodiment, is mounted a material receiving hopper 23, preferably constructed from sheets of light metal alloy. To balance the dead weight of the spider 20, the frame 22 and the hopper 23, the opposite end of the lever 17 has two horizontal rods 24 studded into a connecting flange and a counterweight 25 adjustably mounted thereon. A check link 17' is provided to guide and maintain the condition of level of the frame 22 in the usual manner.

Supported upon the bearing blocks 15 in the bifurcated fulcrum stands 12 are fulcrum pivots 26 of a counterpoise supporting lever 27. Pivots 29, extending laterally from one of the free ends of the lever 27, support bearing blocks 30 of a counterpoise support spider 31. Two posts 32, studded into the upper end of the spider 31 and extending through suitable apertures in a base cover 33, have secured to their upper ends a counterpoise platter 34. The opposite free end of the lever 27 is provided with an integral "loading box" 26 adapted to be filled with lead to counterbalance the dead weight of the parts resting upon pivots 29 in its opposite end. To maintain the condition of level of the counterpoise platter 34, a check link 27' is provided whose ends pivotally engage the counterpoise spider 31 and an adjustable stud 27² on a pedestal-like member 49 which is erected upon the base 11.

For the purpose of disengageably connecting the load supporting lever 17 from the counterpoise supporting lever 27, a link 35 is provided. This link is suspended from a pin 36 extending between two short horizontally projecting arms of a bracket 37 bolted as at 38 to the loading box 28. The separate bracket 37 is only a manufactory expedient and it may be replaced by an integral projecting portion of the lever 27. The lower bight of the link 35, when the lever 27 is cooperating with the lever 17 to counterbalance the weight of a load, engages a pin 39 extending between the arms of a loop formed in a connecting rib 40 of the load spider 20.

The pull resulting from a load as it accumulates in the hopper 23 is transmitted as usual to a load counterbalancing pendulum 43 (Figs. I, II) supported, by means of a pivot 44, upon bearings 45 suitably mounted within an indicator housing 46 which surmounts the pedestal-like member 49 arising from the base 11. The indicator housing 46 comprises a frame 47 and cover members 48 secured to the frame. To accomplish the transmission of this pull, two short spaced arms 51, projecting horizontally from a connecting rib of the lever 17, carry a pivot 52 which engages the lower end of a stirrup 53 whose upper end is suspended from a pivot 54 in a transmission lever 55. This lever, which is of the second order, is rockably mounted, by means of a fulcrum pivot 56, upon bearings 57 seated in the upper ends of fulcrum stands 58 projecting upwardly from the base 11. A power pivot 59, in the opposite end of the lever 55, engages a stirrup 60 on the lower end of a draft rod 61, the upper end of this draft rod being secured to a thin flexible metallic ribbon 62 which overlies and is fastened to the upper end of the arcuate face of a power sector 63 forming a component part of the pendulum 43. This pendulum, in addition, comprises a body portion 64, a stem 65 studded into this body portion and a pendulum weight 66 which is threaded upon the stem 65 in the usual manner.

For the purpose of indicating the condition of balance, an indicator 67 is fastened to an extending finger 68 of the body portion 64. This indicator is provided with the usual index line 69 for cooperation with a short series of weight indicia 70' having a zero indicium 70 marked on a chart 71 fastened to the upper end of the frame 47 within the covers 48. This chart is visible through a window 72 in the housing 46. In addition to the series 70' of weight indicia which represents substantially one-half of the load counterbalancing capacity of the pendulum 43, another indicium 70² is marked on the chart 71.

The indicium represents the total automatic load counterbalancing capacity of the pendulum and is therefore spaced from the last indicium of the series 70'.

The upper extremity of the indicator 67 is further provided with a flag-like projecting portion 73. Extensions of the leading and trailing edges of this portion 73' and 73² respectively intersect each other on the pivotal axis of the pendulum 43. The flag-like projecting portion 73 is adapted to intercept light emanating from a source 74 to prevent it from passing through a slot-like opening 75 and impinging on the sensitive element of a photoelectric tube 76.

The light source 74 is supported by an arm 77 fastened to a plate 78 mounted in an opening 79 in the rear of the indicator housing 46. The photoelectric tube 76 is enclosed in a light tight housing 80 having a forwardly projecting tubular channel 81, the forward end thereof being provided with a mask 82 in which the slot-like opening 75 is located. The tubular channel also forms a means for securing the housing 80 to the plate 78. If desired, the plate 78 may be made adjustable with respect to the indicator housing 46 so that the slot-like opening 75 can be accurately positioned relative to an indicium or mark on the chart 71.

To limit the rocking movement of the counterpoise supporting lever 27 in one direction, a screw 83 is adjustably threaded through the base cover 33 so that its lower end forms a stop for the lever 27 by engaging a surface on the upper portion of the bracket 37 which is bolted to this lever. A nut 84 serves to lock the stop screw 83 in adjusted position. By these means, the angle of upward oscillation of the adjacent end of the lever 27 can be very accurately determined. To damp the oscillations of the scale, a dashpot is provided whose plunger 85, movable within an oil-filled dashpot body 86, is pivotally connected as at 87 to an extending arm 88 of the load spider 20.

Cooperating with the weighing scale just described is a vibratory feeding device 89 comprising a reciprocating motor 90, a material feeding chute 91 actuated by the motor, a material supply hopper 92 and a funnel-like member 93 which is adapted to guide material fed by the vibratory feeding device into the weighing hopper 23 which, by means of the supporting frame 22 and the spider 20, is mounted upon the load lever 17. The hopper 23 has a sloping rear wall and vertical front and side walls. The lower portion of the front wall, comprises a gate 94 which is hinged to the upper portion and for opening this gate a solenoid coil 95, with its armature 96, is mounted in a housing 97 that is fastened to the upper portion of the front wall. The armature 96, by means of a link 98, is pivotally connected to one arm of a crank 99 which is supported on a shaft 100 extending between two spaced brackets 101 fixed to the front wall of the hopper below the housing 97. The other arm of the crank 99 engages one of the links of an over-center toggle 102, the other link being pivotally connected to a bracket 103 on the gate 94. The gate 94 is opened upon energization of the solenoid coil 95 but is so calculated and designed that the force of gravity closes it when the coil 97 is de-energized. The lower portion of the hopper, with its gate, enters a funnel-like member 104. This funnel-like member may be one of an interchangeable series which is graduated in size to enter containers of various sizes.

For a reason which will later become clear, a normally open switch 105 is mounted on the bottom of the housing 97 (Figs. I and V) in such a position that the armature 96 of the solenoid 95 when this is de-energized rests thereon and closes its contacts. To convey current to the coil 95 and to the switch 105 without introducing friction, since the hopper is mounted upon a movable member, an insulating member 106 (Figures I, II and IV) is fastened to the base cover 33. This insulating member is provided with a series of wells 107 that are filled with mercury, each being adapted to receive a thin needle-like plunger 108. The mercury in these wells is metallically connected to a series of binding posts 109 to which leads of the electrical circuit may be connected. The needle-like plungers 108, which are made as slender as is consistent with strength so that the buoyant effect of the mercury into which they dip does not affect the operation of the scale an appreciable extent, are secured to an insulating plate 110 fastened to upstanding fingers 111 of the frame 22. These plungers 108 are electrically connected to the coil 95 and to the switch 105 in the usual manner. This assures an antifriction bridge between relatively movable members of the scale mechanism.

Forming a part of the electrical connection is a normally open zero switch 112 of the so-called "micro" type which is fastened, in inverted position, by means of a sheet metal bracket 113 to the base cover 33. A small elastic metallic arm 114 is riveted to the bracket 113 so that it overlies the contact actuating pin 112' of the "micro" switch 112. A finger 115 depending from the hopper support frame 22 and having adjustment means, urges the metallic arm to close the contact 134 of the switch 112 when the hopper 23 is empty and the load supporting means are in their zero position. A small amount of material adhering to the hopper walls will prevent the load supporting means from returning to the zero position and consequently the contact remains open.

In conditioning the device for operation the operator first adjusts the screw 83 so that the upward stroke of the lever 27 is arrested in a position that insures a clearance between the bottom of the link 35 and the pin 39 in the spider 20, when there is no load in the hopper. This clearance must be sufficient to permit the load lever 17 to rock through an angle of sufficient amplitude to allow the pendulum 43 to counterbalance loads independently of the counterpoise mechanism. The weights of such loads are automatically indicated by the cooperation of the index 69 on the indicator 67 and the series of indicia 70' on the chart 71. When the link 35 is disengaged from the pin, the lever 17 is the sole load supporting lever of the scale and the weight of any load placed in the hopper is counterbalanced only by the pendulum 43 and this weight is indicated by the index 69 on the series of indicia 70'.

For example it is desired to pack in containers loads each weighing three pounds, and it is assumed that the series 70' of indicia is adapted to indicate the weight of 8 ounces of load in the hopper and the total load counterbalancing capacity of the pendulum 43 as represented by the indicium 70² is one pound; the operator then places sufficient counterpoise weights on the platter 34 until the sum of their weights, plus the automatic counterbalancing capacity of the pendulum equals three pounds. In this example counterpoise weights weighing 2 pounds must be placed on the platter 34. The first increment of eight ounces when placed in the hopper is counterbalanced by the pendulum, the lever 17 rocks downwardly until the pin 39 in the spider 20 engages the bottom of the link 35. Additional load will now be suspended from the pin 36 in the bracket 37 of the counterpoise lever 27 and the two levers 17 and 27 cooperate in supporting the load similar to a single even-armed lever. Since they are still "overbalanced" by the weights on the counterpoise platter 3 there is no further movement of the indicator until the load nearly equals the amount that the scale is backweighted. The indicator then moves rapidly in a clockwise direction from its position of rest at the eight ounce indicium on the chart. When the gate 94 of the hopper is opened after the desired amount of material has been determined and a portion of the load has been discharged, the back-weight will immediately carry the lever 27 towards its initial position against its stop formed by the screw 83 and when the load remaining in the hopper amounts to less than the eight ounces of automatic weighing capacity the lever 17 again becomes disengaged from the lever 27 and the amount of such load is then again automatically indicated on the chart. When all the load has been discharged the indicator registers with the zero indicium 70 but any load sticking to the walls of the hopper or remaining therein for any reason whatsoever will be automatically indicated and the operator is clearly notified that not all of the load has been discharged.

In the present invention the scale is adapted to cooperate with and control the operation of material feeding means. For this purpose, the scale, the material feeding means and the hopper gate are electrically connected. After conditioning the device to determine loads of the desired weight by placing the weights on the counterpoise platter 34 which constitute the "backweight," the operator, referring to Figure V, closes a line switch 118. This permits current to flow through leads 119, 120 and through leads 121 and 122 to illuminate the light source 74. At the same time current flows through leads 119, 121 and 123, photo tube amplifier 124, leads 125, 122 and 120 to the other side of the line. Light from the source 74 now passes through the slot 75 in the mask 82 covering the channel 81 of the light tight housing 80 and impinges on the sensitive element of the photo tube 76 causing the coil of sensitive relay 126 to be energized, drawing in its armature and closing contact 127. When the start switch 128 is closed, current flows through the lead 119, through this switch 128, leads 132 and 129, the coil of relay 130, leads 125, 122 and 120 to the other side of the line. This energizes relay 130 and closes a normally open contact 131 of this relay and current now flows through the leads 119, 121, 123, through the contact 131, leads 132 and 129, coil of relay 130 and through leads 125, 122 and 120 to the other side of the line. This constitutes a "hold in" circuit, maintaining the energization of relay 130 when pressure is removed from the start switch 128. Current now flows through leads 121, 123, contact 131, leads 132, 133, 134, zero switch 112, lead 135, coil of relay 136, leads 137, 138, and then through leads 139 and 129 to the other side of the line. This energizes the coil of latch relay 136 drawing in its armature and holding it in this position by means of a mechanical latch 140. Current now flows through leads 119, 121 and 123, through normally open contact 131, leads 132 and 133, through contact of switch 105, lead 141, contact 142, leads 143, 144, through normally closed contact 145 of relay 146, lead 147, coil of relay 148 and then through leads 149, 120 to the other side of the line and also from lead 143, through lead 150, normally closed contact 151 of relay 152, lead 153, through coil of relay 154 and through leads 155, 139 and 120 to the other side of the line. This energizes relays 148 and 154 closing their normally open contacts 156 and 157 respectively.

Closing contacts 156 and 157 of relays 148 and 154 causes the reciprocating motor 90 of the vibratory feeding device 89 to be energized by current flowing through lead 119, contact 157 of relay 154, leads 158 and 159, contact 156 of relay 148, leads 160 and 161 to the coil of this reciprocating motor 90 and then through leads 139 and 120 to the other side of the line. Material is now being fed into the hopper 23 at a relatively high speed until the weight of this material displaces the pendulum to such an extent that the leading edge 73' of the flag-like projection 73 at the upper extremity of the indicator 67 covers the slot-like opening 75 in the channel 81 of the photo tube housing 80, thus preventing light from the source 74 to strike the sensitive element of this photo tube. The resistance of the shaded photo tube 76 de-energizes the coil of the sensitive relay 126 which is a part of the photo-electric amplifying system 124. The de-energization of the coil of the sensitive relay 126 permits the normally closed contact 162 to close and current now flows through the leads 119, 121, 123, contact 131 of relay 130, leads 132 and 133, the contact of gate switch 105, lead 141, contact 142 of latch relay 136, leads 143 and 150, through contact 162 and through lead 163, the coil of relay 146 and then leads 164 and 120 to the other side of the line. This energizes relay 146 and when energized its armature closes contact 165 "sealing in" the relay 146. This also de-energizes relay 148 by opening the contact 145. The current feeding the reciprocating motor 90 of the vibratory feeding means 89 must now flow through the lead 119, contact 157 of relay 154, leads 158 and 159, resistance 166, lead 161 to coil 90 of the reciprocating motor 89 and then through leads 139 and 120 to the other side of the line. The resistance causes the reciprocating motor 89 to operate at a reduced speed. This results in that the remainder of the material is fed at a dribble.

When the index 69 registers with the indicium 70² on the chart 71, the slot-like opening 75 is exposed and light again strikes the sensitive element of the photo tube 76. The increase in the current flowing through the tube causes the sensitive relay 126 to again become energized closing contact 127 and current now flows through leads 119, 121 and 123, contact 131, leads 132 and 133, contact of gate switch 105, lead 141, contact 142 of latch relay 136, leads 143 and 150, contact 127 of sensitive relay 126, lead 167, contact 168 of relay 146, lead 169, through coil of relay 152 and then through leads 170 and 120 to the opposite side of the line. Energization of the relay 152 opens contact 151 deenergizing relay 154 opening the circuit which energizes the reciprocating motor. This stops the flow of the material into the scale hopper 23.

Closure of the contact 127 of the sensitive relay 126 also causes current to flow through leads 169 and 171, through the release coil 172 of the latch relay 136 and then through leads 138, 139 and 120 to the other side of the line. Energization of the coil 172 withdraws the mechanical latch 140 permitting contact 142 to open and de-energizing relays 146 and 152. Withdrawal of the mechanical latch 140 permits normally closed contact 173 of latch relay 136 to close. Current now flows through leads 119, 121 and 123, contact 131 of relay 130, leads 132, 133 and 134, contact 173, lead 174, gate operating solenoid 95 and through leads 138, 139 and 120 to the other side of the line. Energization of the solenoid 95 draws in its armature 96 and through the crank and toggle link structure opens the gate 94 of the scale hopper 23. The material that has accumulated in this hopper now drops through the funnel-like member 104 into a container positioned there below.

When all the material in the hopper has been discharged, the load counterbalancing pendulum 43 returns to its zero position and the index 69 of the indicator 67 is in registration with the zero indicium 70. During its return movement, the flag-like projection 73 on the indicator 67 first covers the slot-like opening 75 thus shading the sensitive element of the photo tube 76 and then again uncovering the slot-like opening 75 and exposing the sensitive element to the light emanating from the source but since the contact 142 of the latch relay 136 is open the relays 148 and 154, controlling the operation of the reciprocating motor 90, will not be energized.

When the pendulum has reached its zero position the device is ready to repeat the cycle of operations hereinbefore described, but means are provided to prevent the initiation of a new cycle unless the hopper gate 94 is closed and all material has been discharged from the hopper. These means include the gate switch 105 whose contact is normally open but held closed by the armature 96 of the gate operating solenoid 95 when this coil is deenergized and the gate is closed in the manner hereinbefore described.

The contact of the switch 105 is in the circuit that energizes the relays 148 and 154 which control the operation of the vibratory feeder 89. The zero switch 112, which is normally open, is closed by the small metallic arm 114 and the adjustable finger 115 only when all the material in the hopper 23 has been discharged and the load supporting means of the scale are in their zero position. Closure of the contact of the switch 112 permits current to flow through leads 119, 121 and 123, contact 131, leads 132, 133, 134, the contact of the switch 112, lead 135, coil of latch relay 136 and leads 137, 138, 139 and 120 to the other side of the line. The energization of the latch relay opens a normally closed contact 173 and thus de-energizes the gate operating solenoid 95 and the gate now drops by gravity into its closed position. The de-energization of the solenoid 95 permits its armature 96 to drop and close the contact of the switch 105. When the coil of the latch relay 136 was energized its contact 142 was closed and the device is now in condition to repeat its cycle of operations.

If, for any reason, the coil 172 of latch relay 136 cannot operate, a "sealing" circuit is provided for relay 152. This permits current to flow through leads 119, 121 and 123, contact 131 of relay 130, leads 132, 133, contact of switch 105, lead 141, contact 142, leads 143, 150, contact 175, lead 169, the coil of relay 152 and then through leads 170 and 120 to the other side of the line. This maintains the energization of the coil of relay 152 causing contact 151 to remain open and thus prevent the operation of the feeding device.

From the foregoing it will be seen that the circuit just described interlocks the several operations in such a manner that the device cannot operate unless no material remains in the hopper, thus assuring accurate loads.

The embodiments of the invention herein shown and described are to be regarded as illustrative only, and it is to be understood that the invention is susceptible to variation, modification and change within the spirit and scope of the subjoined claims.

Having described the invention, I claim:

1. In a device of the class described, in combination, weighing mechanism comprising load receiving means including a hopper, disengageable load counterpoising means for back-weighting said weighing mechanism, a load counterbalancing pendulum operatively connected to said load receiving means for automatically counterbalancing an increment of the load, an indicator connected to and actuated by said pendulum, a chart for said indicator, a series of weight indicia including a zero indicium marked on said chart and adapted to indicate the weight of the increment of load counterbalanced by said load counterbalancing pendulum, an indicium marked on said chart in spaced relation to said series of indicia, a light sensitive element, means for masking said light sensitive element having an opening, such opening being positioned in predetermined relation to said indicium on said chart in spaced relation to said series of indicia on said chart, a lamp for illuminating said light sensitive element, means on said indicator for intercepting light emanating from said lamp, an electrically operated feeding means for delivering material to said hopper, a gate on said hopper adapted to close by the action of gravity, electrical means for opening said gate, an electrical circuit for energizing said light sensitive element as well as said electrically operated feeding means and said electrical means for opening said gate on said hopper, means comprising normally open switches in said electrical circuit for preventing energization of said electrically operated feeding means, and means associated with said hopper and said hopper gate for closing said normally open switches when said counterpoising means is disengaged and said means on said indicator for intercepting light from said lamp is in a nonintercepting position and said indicator is in registration with said zero indicium on said chart.

2. In a device of the class described, in combination, weighing mechanism including a lever system, a material receiving hopper mounted thereon, automatic load counterbalancing mechanism operatively connected thereto, an indicator actuated by said load counterbalancing mechanism, a chart cooperating with said indicator and having marked thereon a series of weight indicia including a zero indicium, an additional indicium marked on said chart and spaced from said series, said lever system comprising a load lever supporting said hopper and, a counterpoise lever adapted to receive a counterpoise for back-weighting said scale for cooperation with said lever system, electrically actuated material feeding means adapted to deliver material to said hopper, a normally disengaged connection between said counterpoise lever and said lever system, means for causing said normally disengaged connection to connect said counterpoise lever and said lever system when a predetermined amount of material has been delivered into said hopper, an electrical circuit connecting said weighing mechanism and said material feeding means, means cooperating with said indicator for controlling the operation of said material feeding means through said circuit and for stopping the delivery of material to said hopper when said indicator is in registration with said indicium spaced from said series on said chart, a gate on said hopper, a solenoid coil, an armature operated by said solenoid for opening said gate, a switch in said electrical circuit having normally open contacts associated with said armature, said armature being adapted to close such normally open contacts when said solenoid is de-energized, a switch in said circuit having normally open contacts, and means associated with said hopper for closing contacts of the last named switch when said hopper is empty and said normally disengaged connection between counterpoise lever and said lever system is in its normal condition.

3. In a device of the class described, in combination, a weighing scale for determining loads of equal predetermined weight in automatically recurring cycles of operations, said weighing scale comprising a lever system, a load receiving hopper mounted upon said lever system, a load counterbalancing pendulum operatively connected to said lever system, indicating means actuated by said load counterbalancing pendulum, a material feeding means for delivering material to said load receiving hopper, an independently mounted counterpoise lever, a receiver supported by said lever for the reception of a counterpoise for back-weighting said weighing scale, a link suspended from said counterpoise lever, said link being adapted to engage said lever system when a predetermined quantity of material has been delivered to said hopper, a discharge gate on said hopper, electrical means for actuating said discharge gate, a light source, a photoelectric element controlled by said indicating means and controlling the operation of said material feeding means, an electrical circuit connecting said light source, said photoelectric element, said material feeding means and said discharge gate actuating means for opening said gate to discharge such material when said photoelectric element senses the condition of balance of said weighing scale, an adjustable stop for causing said link suspended from said counterpoise lever to become disengaged from said lever system when a portion of such material in said hopper has been discharged and means in said electrical circuit for preventing the reoccurrence of a cycle of operations until all material in said hopper has been discharged, said means in said circuit for preventing reoccurrence of a cycle of operations comprising one or more switches having normally open contacts and means associated with said hopper for closing such open contacts when all material in said hopper has been discharged.

4. In a device of the class described, in combination, a weighing scale for determining loads of equal predetermined weight in automatically recurring cycles of operations, said weighing scale comprising a lever system, a load receiving hopper mounted upon said lever system, a load counterbalancing pendulum operatively connected to said lever system, indicating means actuated by said load counterbalancing pendulum, a material feeding means for delivering material to said load receiving hopper, an independently mounted counterpoise lever, a receiver supported by said lever for the reception of a counterpoise for backweighting said weighing scale, a link engaging said counterpoise lever and being adapted to engage said lever system when a predetermined quantity of material has been delivered to said hopper, a discharge gate on said hopper, electrical means for actuating said discharge gate, a light source, a photoelectric element controlled by said indicating means and controlling the operation of said material feeding means, an electrical circuit connecting said light source, said photoelectric element, said material feeding means and said discharge gate actuating means for opening said gate to discharge such material when said photoelectric element senses the condition of balance of said weighing scale, an adjustable stop positioned in the path of movement of said counterpoise lever and adapted to cause disengagement of said link from said lever system when a portion of such material in said hopper has been discharged and means in said electrical circuit for preventing the reoccurrence of a cycle of operations until all material in said hopper has been discharged.

5. In a device of the class described, in combination, a base, a load supporting lever and a counterpoise supporting lever mounted upon said base, a disengageable connection operatively connecting said levers, a load counterbalancing pendulum, means for connecting said load counterbalancing pendulum to said load supporting lever, an indicator secured to and actuated by said load counterbalancing pendulum, a chart cooperating with said indicator, indicia on said chart including a zero indicium and an indicium spaced from said zero indicium marked on said chart, casings for enclosing said levers, said load counterbalancing pendulum and said indicating means, a material receiving hopper mounted upon said load supporting lever exteriorly of said casings, an electrically actuated material feeding means for delivering material to said hopper, a gate on said hopper adapted to be closed by the action of gravity, toggle means for locking said gate, electrical means for unlocking said toggle means and opening said gate, an electric circuit for energizing said electrically actuated material feeding means, means cooperating with said indicator for de-energizing said circuit when said indicator registers with said indicium spaced from zero indicium on said chart and conditioning said electrical means for opening said gate, an adjustable stop in the path of movement of said counterpoise supporting lever for causing said disengageable connection between said load supporting lever and said counterpoise supporting lever to disengage upon discharge of some of the material in said hopper, a normally open switch in said circuit and means movable with said hopper for closing said switch when all material in said hopper has been discharged and said indicator registers with said zero indicium on said chart.

6. In a device of the class described, in combination, a weighing scale comprising a rockably mounted load supporting lever, automatic load counterbalancing mechanism operatively connected thereto and automatic load indicating means actuated thereby, manipulative load counterbalancing mechanism for back weighting said weighing scale including an independently mounted rockable lever, a disengageable connection between said independently mounted lever and said load supporting lever, an adjustable stop positioned in the path of rocking movement of said independently mounted lever for arresting the movement of said lever and causing disengagement of said disengageable connection, said automatic load indicating means comprising an indicator, a chart, a series of indicia including a zero indicium and an indicium spaced from said series marked on said chart, a material receiving hopper mounted on said load supporting lever, a material feeding means for delivering material to said hopper, an electrical circuit and electrical means within said circuit for actuating said feeding means, a switch cooperating with said indicator and said chart for stopping the actuation of said material feeding means and causing discharge of such material in said hopper when said indicator registers with the indicium spaced from said series of indicia on said chart, and said electrical circuit including a switch for preventing reactuation of said feeding means unless said lever system returns to no-load position indicating that said hopper is empty.

7. In a device of the class described, in combination, a weighing scale comprising a rockably mounted load supporting lever, automatic load counterbalancing mechanism operatively connected thereto and automatic load indicating means actuated thereby, manipulative load counterbalancing mechanism for back weighting said weighing scale including an independently mounted rockable lever, a disengageable connection between said independently mounted lever and said load supporting lever and an adjustable stop positioned in the path of rocking movement of said independently mounted lever for arresting the movement of said lever and causing disengagement of said disengageable connection, said automatic load indicating means comprising an indicator secured to said automatic load counterbalancing mechanism, a fixed chart, a series of indicia including a zero indicium and a indicium spaced from said series marked on said chart, a material receiving hopper mounted on said load supporting lever, a material feeding means for delivering material into said hopper, an electrical circuit and electrical means within said circuit for actuating said feeding means, a light source, a photoelectric cell adapted to be influenced by the relative position of said indicator and said chart for controlling the action of said material feeding means and causing discharge of such material in said hopper when said indicator registers with the indicium spaced from said series of indicia on said chart, and said electrical circuit including a switch for preventing reactuation of said feeding means unless said lever system returns to zero-load position with said disengageable connection between said load supporting lever and said independently mounted lever in a condition of disengagement.

MARK A. WECKERLY.